United States Patent
Wood et al.

(10) Patent No.: US 10,003,766 B2
(45) Date of Patent: Jun. 19, 2018

(54) CAMERA DEVICE WITH A DYNAMIC TOUCH SCREEN SHUTTER

(75) Inventors: Christopher William Wood, Guelph (CA); Jonas Ove Arbsjö, Malmö (SE)

(73) Assignee: BlackBerry Limited, Waterloo, Ontario (CA)

(*) Notice: Subject to any disclaimer, the term of this patent is extended or adjusted under 35 U.S.C. 154(b) by 617 days.

(21) Appl. No.: 13/541,477

(22) Filed: Jul. 3, 2012

(65) Prior Publication Data

US 2013/0286251 A1 Oct. 31, 2013

Related U.S. Application Data

(63) Continuation of application No. 13/458,448, filed on Apr. 27, 2012, now Pat. No. 9,041,844.

(51) Int. Cl.
| | |
|---|---|
| H04N 5/228 | (2006.01) |
| H04N 5/76 | (2006.01) |
| H04N 5/77 | (2006.01) |
| H04N 5/232 | (2006.01) |

(52) U.S. Cl.
CPC ........... *H04N 5/76* (2013.01); *H04N 5/23216* (2013.01); *H04N 5/772* (2013.01); *H04N 5/23212* (2013.01)

(58) Field of Classification Search
CPC .......................... H04N 5/76; H04N 5/23216
USPC ............................................. 348/345, 208.12
See application file for complete search history.

(56) References Cited

U.S. PATENT DOCUMENTS

| | | | |
|---|---|---|---|
| 7,034,881 B1* | 4/2006 | Hyodo et al. | 348/333.12 |
| 2003/0163623 A1* | 8/2003 | Yeung | 710/300 |
| 2006/0072028 A1* | 4/2006 | Hong | 348/333.01 |
| 2007/0018069 A1* | 1/2007 | Higashino | 250/200 |
| 2009/0033786 A1* | 2/2009 | Finkelstein et al. | 348/345 |
| 2011/0242395 A1 | 10/2011 | Yamada et al. | |
| 2011/0249961 A1* | 10/2011 | Brunner | 396/213 |

(Continued)

FOREIGN PATENT DOCUMENTS

| | | |
|---|---|---|
| CN | 102196178 A | 9/2011 |
| EP | 2 106 126 A2 | 9/2009 |

OTHER PUBLICATIONS

European Search Report dated Oct. 8, 2012, issued for EP Application No. 12165976.7 (English).

(Continued)

*Primary Examiner* — Usman Khan
(74) *Attorney, Agent, or Firm* — Jon Gibbons; Fleit Gibbons Gutman Bongini & Bianco P.L.

(57) ABSTRACT

A camera device with a dynamic touch screen shutter, and method therefor, are provided. The camera device comprises: a sensor for providing an electronic signal corresponding to an image; a touchscreen having a region for displaying the image and receiving touch input, the region having at least one subregion; and a processor enabled to: display the image in the region; execute a shutter command to store the image in a memory when the touch input is received in the region but not in the at least one subregion when the at least one subregion contains at least one of an icon and a graphical control, the graphical control for controlling the camera device; change displaying of at least one of the icon and the graphical control; and, in response, dynamically change a position of the at least one subregion within the region.

25 Claims, 14 Drawing Sheets

(56) References Cited

U.S. PATENT DOCUMENTS

2012/0169670 A1* 7/2012 Kim et al. .................. 345/175
2012/0213407 A1* 8/2012 Haikin et al. ............... 382/103

OTHER PUBLICATIONS

"Xperia arc S—Extended User guide," Sony Ericsson, 2011, XP002683537, p. 1-123 (English).
European Office Action dated Mar. 28, 2014, issued in European Patent Application No. 12 165 976.7.
SonyEricssonSupport: "Xperia™ arc S—Pictures and videos", Mar. 11, 2011 (Mar. 11, 2011), p. 1, XP054975313, Retrieved from the Internet: URL:http://www.youtube.com/watch?v=C3a4Z0p9wL0 [retrieved on Feb. 10, 2014].
Office Action dated Nov. 30, 2015 for Chinese Patent Application No. 20130150237.3.
https://www.youtube.com/watch?v=Do8azZq5kAo dated Jun. 24, 2011.

* cited by examiner

CAMERA DEVICE WITH A DYNAMIC TOUCH SCREEN SHUTTER

CROSS-RELATED APPLICATIONS

The present application is a continuation of, and claims priority from, U.S. patent application Ser. No. 13/458,448 filed on Apr. 27, 2012, the contents of which are incorporated herein by reference.

FIELD

The specification relates generally to a camera devices, and specifically to a camera device with a dynamic touch screen shutter.

BACKGROUND

A touch screen shutter at a camera device can be convenient, but issues are introduced when icons to control other camera functions are also present on the touch screen.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
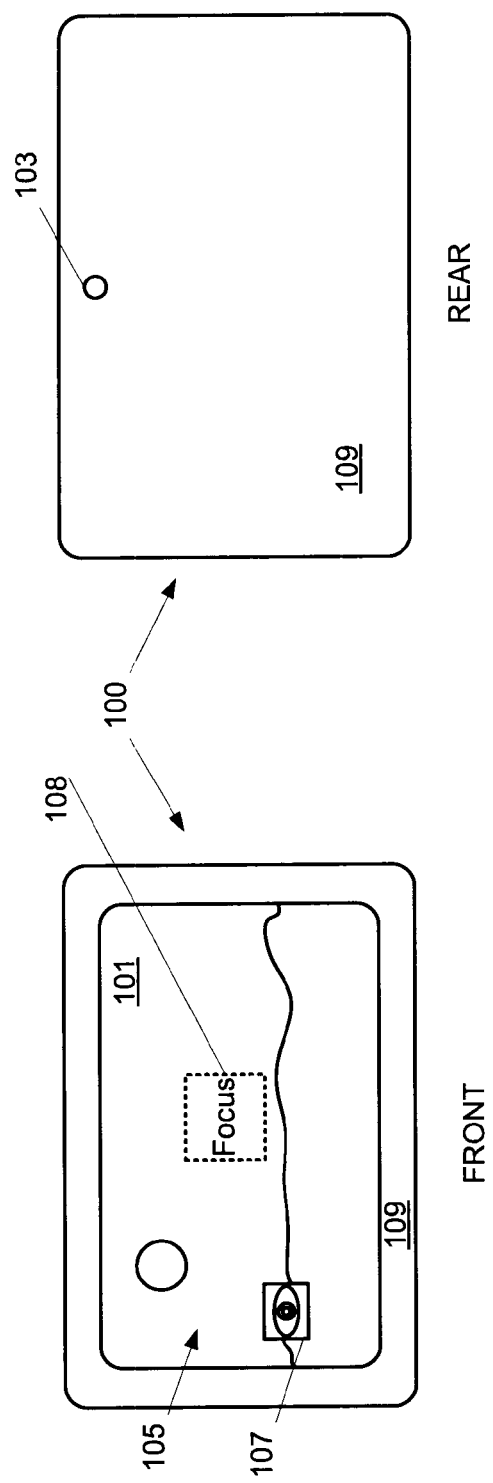
FIG. 1 depicts front and rear views of a camera device with a dynamic touch screen shutter, according to non-limiting implementations.

An aspect of the specification provides a camera device comprising: a sensor for providing an electronic signal corresponding to an image; a memory for storing the image; a touch screen having a region for displaying the image and receiving touch input, the region having at least one subregion; and a processor enabled to: display the image in the region; execute a shutter command to store the image in the memory when touch input is received in the region when the at least one subregion contains neither an icon and a graphical control, the graphical control for controlling the camera device; and, execute the shutter command to store the image in the memory when the touch input is received in the region but not in the at least one subregion when the at least one subregion contains at least one of the icon and the graphical control.

The icon can represent a non-default operating condition of the camera device.

The processor can be further enabled to: change displaying of at least one of the icon and the graphical control; and, in response, dynamically change a position of the at least one subregion within the region. The processor can be further enabled to: execute the shutter command when the touch input is received in a previous position of the at least one subregion but not in a current position of the at least one subregion.

The processor can be further enabled to change displaying of the at least one subregion when one or more of: input data is received to change displaying of at least one of the icon and the graphical control; and, a condition for changing displaying of at least one of the icon and the graphical control is sensed at the camera device.

At least one of the icon and the graphical control can be moveable on the touch screen, the processor further enabled to dynamically change a position of the at least one subregion in response thereto.

The region can comprise an entire display area of the touch screen.

The camera device can further comprise one or more of a tablet device, a computing device, a personal computer, a laptop computer, a portable electronic device, a mobile computing device, a portable computing device, a tablet computing device, a laptop computing device, a desktop phone, a telephone, a PDA (personal digital assistants), a cellphone, a smartphone, and a digital camera.

The at least one graphical control can comprise controls to adjust one or more of: shutter settings, red eye reduction settings; focus settings; depth of focus settings; a memory size of the at least one image; and a resolution of the least one image.

The sensor can comprise at least one of: a digital camera sensor; a CMOS (Complementary metal-oxide-semiconductor) image sensor; and a CCD (charge-coupled device) image sensor.

The touch screen can comprise: one or more of a cathode ray tube, a flat panel display, a liquid crystal display (LCD), an organic light emitting diode (OLED) display, and a plasma display; and, one or more of a capacitive touch screen panel and a resistive touch screen panel.

The camera device can further comprise a housing, the housing comprising the sensor, the memory, the touch screen device and the processor.

The camera device can further comprise a lens system for focusing light on the sensor.

Another aspect of the specification provides a method in a camera device comprising: displaying an image in a region of a touch screen of the camera device, the region having at least one subregion, the image acquired via a sensor for providing an electronic signal corresponding to the image; executing, via a processor of the camera device, a shutter command to store the image in a memory when touch input is received in the region when the at least one subregion contains neither an icon and a graphical control, the graphical control for controlling the camera device; and executing the shutter command to store the image in the memory when the touch input is received in the region but not in the at least one subregion when the at least one subregion contains at least one of the icon and the graphical control.

The icon can represent a non-default operating condition of the camera device.

The method can further comprise: changing displaying of at least one of the icon and the graphical control; and, in response, dynamically changing a position of the at least one subregion within the region. The method can further comprise: executing the shutter command when the touch input is received in a previous position of the at least one subregion but not in a current position of the at least one subregion.

The method can further comprise changing displaying of the at least one subregion when one or more of: input data is received to change displaying of at least one of the icon and the graphical control; and, a condition for changing displaying of at least one of the icon and the graphical control is sensed at the camera device.

At least one of the icon and the graphical control can be moveable on the touch screen, and the method can further comprise dynamically changing a position of the at least one subregion in response thereto.

The region can comprise an entire display area of the touch screen.

Yet a further aspect of the specification provides a computer program product, comprising a computer usable medium having a computer readable program code adapted to be executed to implement a method comprising: displaying an image in a region of a touch screen of the camera device, the region having at least one subregion, the image acquired via a sensor for providing an electronic signal corresponding to the image; executing, via a processor of the camera device, a shutter command to store the image in a memory when touch input is received in the region when the at least one subregion contains neither an icon and a graphical control, the graphical control for controlling the camera device; and, executing the shutter command to store the image in the memory when the touch input is received in the region but not in the at least one subregion when the at least one subregion contains at least one of the icon and the graphical control.

FIG. 1 depicts front and rear views of a camera device 100 with a dynamic touch screen shutter, according to non-limiting implementations. Camera device 100, also interchangeably referred to herein as camera 100, comprises a touch screen device 101 and a sensor 103 for providing an electronic signal corresponding to an image, the image acquired, for example via a lens system, as described below.

It is appreciated that the touch screen device 101, interchangeably referred to hereafter as touch screen 101, has a region for displaying an image 105 and receiving touch input, the region having at least one subregion, as will be explained in further detail below. Camera 100 is further generally enabled to: display image 105 in the region; execute a shutter command to store image 105 in a memory when touch input is received in the region when the at least one subregion contains neither icon 107 and graphical control 108, graphical control 108 for controlling camera 100; and, execute the shutter command to store the image in the memory when the touch input is received in the region but not in the at least one subregion when the at least one subregion contains at least one of icon 107 and graphical control 108. It is further appreciated that graphical control 108 can comprise one or more of an icon for controlling a function of camera 100 and a given region of touch screen 101 that, when activated, controls a function of camera 100; however graphical control 108 need not comprise an icon. Further icon 107 can comprise one or more of a control for controlling a function of camera 100 and an icon representing a non-default operating condition of camera 100.

Further, as will presently be explained, camera device 100 is generally enabled to: change displaying of at least one of icon 107 and graphical control 108; and, in response, dynamically change a position of the at least one subregion within the region.

It is appreciated that camera 100 can comprise any camera device that includes a touch screen device and a sensor for acquiring electronic images. Camera 100 can include, but is not limited to, any suitable combination of digital cameras, computing devices, personal computers, laptop computers, portable electronic devices, mobile computing devices, portable computing devices, tablet computing devices, laptop computing devices, desktop phones, telephones, PDAs (personal digital assistants), cellphones, smartphones, and the like.

Touch screen 101 comprises a display device and a touch screen panel, located on the display device, and described in further detail below. Hence, it is appreciated that touch screen 101 is generally enabled to display images acquired via sensor 103 and to receive input, specifically touch input. For example, when a at least one of icon 107 and graphical control 108 is displayed at touch screen 101, touch input can be received at a subregion of touch screen 101 corresponding to at least one of icon 107 and graphical control 108, causing a function associated with the at least one of icon 107 and graphical control 108 to activate and/or to cause a displaying of further icons and/or graphical controls, such as a menu and the like, to select options associated with at least one of icon 107 and graphical control 108. While only one icon 107 and one graphical control 108 are depicted at FIG. 1, it is appreciated that any suitable number of icons and graphical controls can be displayed at touch screen 101. For example, one or more of icons (including icon 107), can include, but are not limited to, icons corresponding to a graphical control, icons representing a non-default operating condition of camera 100, icons representing a red eye reduction setting, icons representing a shutter setting, icons representing a flash setting, icons representing a focus setting, icons representing a depth of focus setting, icons representing a memory setting and the like. Further, one or more graphical controls (including graphical control 108), can include but are not limited to, graphical controls to adjust one or more of: shutter settings, red eye reduction settings; focus settings; depth of focus settings; flash settings; a memory size of the at least one image; a resolution of the least one image, and the like.

In a specific non-limiting example, icon 107 comprises an icon representative of a red-eye reduction setting; in some implementations, when touch input is received at an area of touch screen 101 corresponding to icon 107, a red-eye reduction function can be turned on (when off) or off (when on). In other implementations, icon 107 merely represents a state of a red-eye reduction setting.

Similarly, in a specific non-limiting example, graphical control 108 comprises a focus control area that specifies a location of an image on which sensor 103 is to focus when acquiring an image for storage. Further, it is appreciated that while a portion of graphical control 108 can comprise an icon, such a graphical box, graphical control 108 can also comprise an area of image 105 and need not comprise an icon: for example, a graphical control 108 can be indicated at touch screen 101 via changing displaying of image 105, so that displaying of image 105 at an area associated with graphical control 108 appears different from the rest of image 105. In some non-limiting implementations the area associated with graphical control 108 can be monochrome whereas the rest of image 105 can be in colour, or vice versa. Other ways of displaying graphical control 108 are within the scope of present implementations.

Further, it is appreciated that not all images acquired via sensor 103 are stored: indeed, images 105 displayed at touch screen 101 can comprise a series of images and/or a video stream, representing images in a field of view of sensor 103, and a specific image is acquired only when a shutter command is executed, as will presently be described. It is hence appreciated that a focus control area (i.e. graphical control 108) can be moved on touch screen 101 to a position that sensor 103 is to focus on when acquiring an image for storage. Graphical control 108 can be moved by receiving touch input at an area of touch screen 101 corresponding to graphical control 108, and receiving further touch input indicating that graphical control 108 is to be moved, as described below with reference to FIGS. 10 to 12. For example, graphical control 108 can be dragged to any suitable position on touch screen 101.

In any event, in depicted implementations, sensor 103 focuses on the location defined by graphical control 108. Then, when a shutter command is executed, an image is acquired at sensor 103 with focus at the location defined by graphical control 108, and stored at a memory. Further, any other activated camera functions can be implemented when the shutter command is executed, including, but not limited to, red-eye reduction.

It is appreciated that execution of a shutter command can occur independent of whether any other camera functions are activated. In other words, when a shutter command is executed, an image is acquired via receiving an electronic signal at sensor 103, the electronic signal corresponding to the image, and the image stored at a memory. In particular, a shutter command can be implemented by receiving touch input at touch screen 101 which, when received, causes shutter command to be executed, thereby causing at least one image 105 to be acquired via sensor 103, the touch input received anywhere in a region of touch screen 101 displaying image 105, but not in at least one subregion containing at least one of icon 107 and graphical control 108. In other words, when touch screen 101 is touched at any location where image 105 is displayed, other than areas where icon 107 and graphical control 107 are displayed, an image is acquired and stored.

Sensor 103 generally comprises any suitable device for acquiring images, including but not limited one or more of a camera device, a video device, a CMOS (Complementary metal-oxide-semiconductor) image sensor and a CCD (charge-coupled device) image sensor. However, any suitable device for acquiring digital images is within the scope of present implementations. While camera 100 can comprise further sensors, it is appreciated that, in particular, sensor 103 is enabled to acquire images from a field of view facing away from the rear of camera 100. However, the placement and/or field of view of sensor 103 is generally non-limiting: for example, sensor 103 could be located to acquire images in a field of view adjacent touch screen 101. Indeed, in some implementations, camera 100 can comprise more than once sensor similar to sensor 103, for acquiring images at more than one field of view. Further, images acquired by sensor 103 can comprise one or more of camera images, video images, video streams and the like.

It is yet further appreciated that in some implementations sensor 103 can comprise an infrared sensor such that images comprise electronic infrared images and hence camera device 100 can function in low ambient lighting scenarios.

Camera 100 further comprises a housing 109 containing touch screen 101, sensor 103, and any other suitable components, such as processors, memories and any associated electronics. Housing 109 can comprise any suitable combination of metal, plastic and glass.

Figure 2:
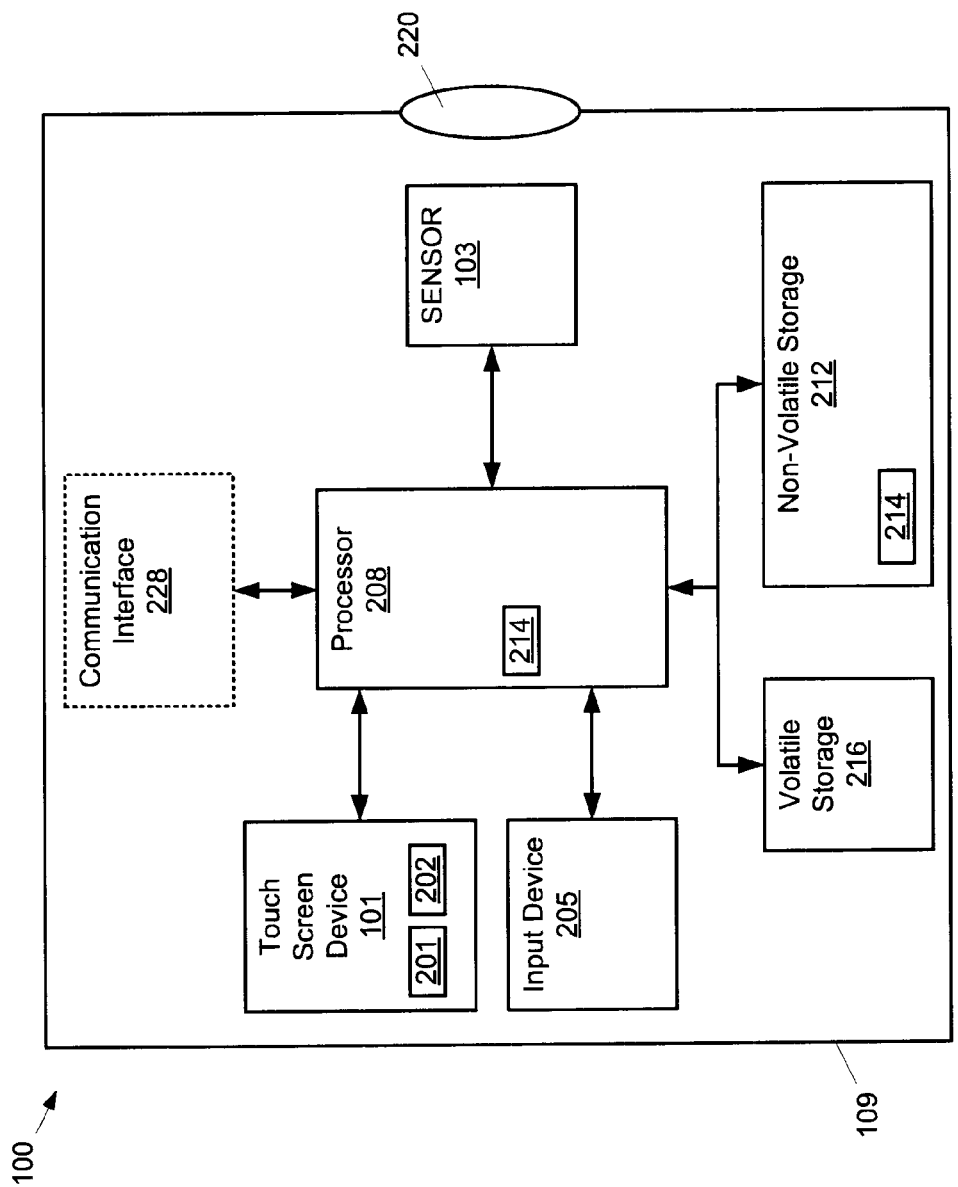
FIG. 2 depicts a schematic diagram of the camera device of FIG. 1, according to non-limiting implementations.

Attention is next directed to FIG. 2, which depicts a schematic diagram of camera 100 according to non-limiting implementations. It should be emphasized that the structure in FIG. 2 is purely exemplary, and contemplates a device that can be used to both acquire images using sensor 103 and display acquired images at touch screen 101. In some implementations, camera 100 can comprise a smartphone, and the like, and hence be used for wireless data communications (e.g. email, web browsing, text, and the like) and/or wireless voice (e.g. telephony), in addition to camera functions.

In some implementations, camera 100 comprises at least one optional input device 205, in addition to touch screen 101, input device 205 generally enabled to receive input data, and can comprise any suitable combination of input devices, including but not limited to a keyboard, a keypad, a pointing device, a mouse, a track wheel, a trackball, a touchpad, and the like. Other suitable input devices are within the scope of present implementations.

However, in other implementations, touch screen 101 is enabled as the primary input device of camera 100, and input device 205 may not be present (i.e. input device 205 is optional).

It is further appreciated that touch screen 101 comprises a display device 201 and a touch screen panel 202. Display device 201 can include, but is not limited to, one or more of: CRT (cathode ray tube) and/or flat panel displays (e.g. LCD (liquid crystal display), plasma, OLED (organic light emitting diode) displays and the like). Touch screen panel 202 includes but is not limited to a capacitive touch screen panel, a resistive touch screen panel, and the like.

Display device 201 and touch screen panel 202 are generally aligned such that areas of display device 201 where controls 107 are displayed correspond to areas of touch screen panel 202 where touch input can be received to activate and/or select the corresponding controls.

In any event, input from touch screen 101 (e.g. touch screen panel 202), and/or optional input device 205, is received at processor 208 (which can be implemented as a plurality of processors, including but not limited to one or more central processors (CPUs)). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Further, in some implementations, at least a portion of non-volatile storage unit 212 can be removable, and can include, but is not limited to, a flash drive. Programming instructions 214 that implement the functional teachings of camera 100 as described herein are typically maintained, persistently, in non-volatile storage unit 212 and used by processor 208 which makes appropriate utilization of volatile storage unit 216 during the execution of such programming instructions 214. Those skilled in the art will now recognize that non-volatile storage unit 212 and volatile storage unit 216 are examples of computer readable media that can store programming instructions executable on processor 208. Furthermore, non-volatile storage unit 212 and volatile storage unit 216 are also examples of memory units and/or memory modules.

It is further appreciated that processor 208 is connected to sensor 103, and further acquires images via sensor 103; for example, sensor 103 provides an electronic signal corresponding to an image, which is received at processor 208; processor 208 processes the electronic signal and causes the image to be displayed at touch screen device 101 (e.g. at display device 201).

Further, images can be stored at non-volatile storage unit 212, and hence non-volatile storage unit 212 comprises a memory for storing images acquired by sensor 103. Alternatively, images acquired via sensor 103 can be stored at one or memories external to sensor 103, which can be one or more of local and remote to sensor 103. When an external memory is used to store images acquired by sensor 103, sensor 103 can further comprise an interface (not depicted) for accessing the external memory.

It is yet further appreciated that camera 100 comprises a lens system 220 for focusing light onto sensor 103, the focused light sensed by sensor 103 for providing the electronic signal corresponding to an image. Lens system 220 can comprise one or more lenses. In some implementations, lens system 220 can be modular and/or interchangeable, such that various lenses can be used with camera 100. In other implementations, lens system 220 can be fixed. In yet further implementations a sensor module can comprise sensor 103 and lens system 220.

Processor 208 can be further configured to communicate with touch screen 101 to determine when touch input is received at touch screen panel 202 and control camera functions accordingly as described above.

It is generally appreciated that touch screen 101 comprises circuitry, for example at display device 201, that can be controlled, for example by processor 208, to display images 105 and/or controls 107. It is further appreciated that displaying an image at touch screen 101 can include, but is not limited to, rendering an image at touch screen 101. For example, processor 208 can control circuitry at display device 201 to render an image. Indeed, it is appreciated that rather than displaying an image, an icon, a graphical control and the like, processor 208 can be enabled to render an image, an icon, a graphical control and the like at touch screen 101.

It is further appreciated that programming instructions 214 can include an application for causing processor 208 to: display an image in a region of touch screen 101; execute a shutter command to store the image in a memory (such as non-volatile storage unit 212) when touch input is received in the region when at least one subregion contains neither an icon and a graphical control (e.g. one or more of icon 107 and graphical control 108), the graphical control for controlling camera 100; and, execute the shutter command to store the image in the memory when the touch input is received in the region but not in the at least one subregion when the at least one subregion contains at least one of the icon and the graphical control.

In depicted implementations, processor 208 also optionally connects to a network communication interface 228, referred to hereafter as interface 228, which can be implemented as one or more radios configured to communicate with one or more communication networks. In general, it will be appreciated that interface 228 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination. Interface 228 can also be used to communicate with an external memory for storage of images.

It is appreciated that in the depicted implementation, housing 109 contains touch screen 101, sensor 103, input device 205, processor 208, non-volatile storage unit 212, volatile storage unit 216, lens system 220, and optionally communication interface 228.

It is further appreciated that camera 100 can comprise any other suitable applications for operating and/or configuring camera 100, including, but not limited to, camera applications, imaging applications, presentation applications, messaging applications, gaming applications and the like.

While not depicted, it is further appreciated that camera 100 further comprises one or more of a power source, including but not limited to a battery and/or a connection to an external power source, including, but not limited to, a main power supply.

In any event, it should be understood that in general a wide variety of configurations for camera 100 are contemplated.

Figure 3:
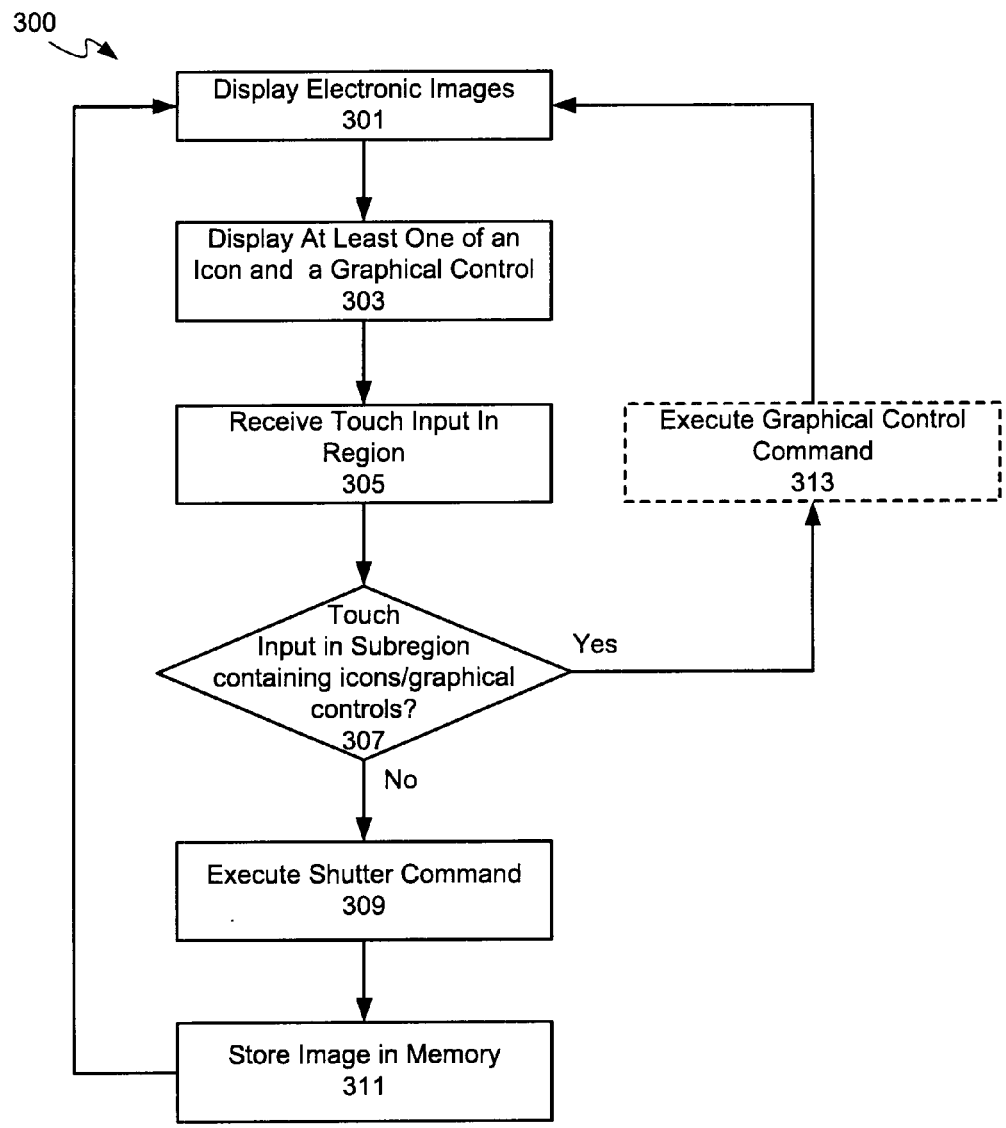
FIG. 3 depicts a flowchart illustrating a method for controlling a dynamic touch screen shutter at the camera device of FIG. 1, according to non-limiting implementations.

Attention is now directed to FIG. 3 which depicts a flowchart illustrating a method 300 for controlling a dynamic touch screen shutter at a camera device, according to non-limiting implementations. In order to assist in the explanation of method 300, it will be assumed that method 300 is performed using camera 100. Furthermore, the following discussion of method 300 will lead to a further understanding of camera 100 and its various components. However, it is to be understood that camera 100 and/or method 300 can be varied, and need not work exactly as discussed herein in conjunction with each other, and that such variations are within the scope of present implementations. It is appreciated that, in some implementations, method 300 is implemented in camera 100 by processor 208.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of camera 100 as well.

It is further appreciated in the following discussion that when data is said to be displayed at touch screen 101, data is displayed at display device 201; similarly, when data and/or input is said to be received at touch screen 101, data and/or input is received at touch screen panel 202.

Figure 4:
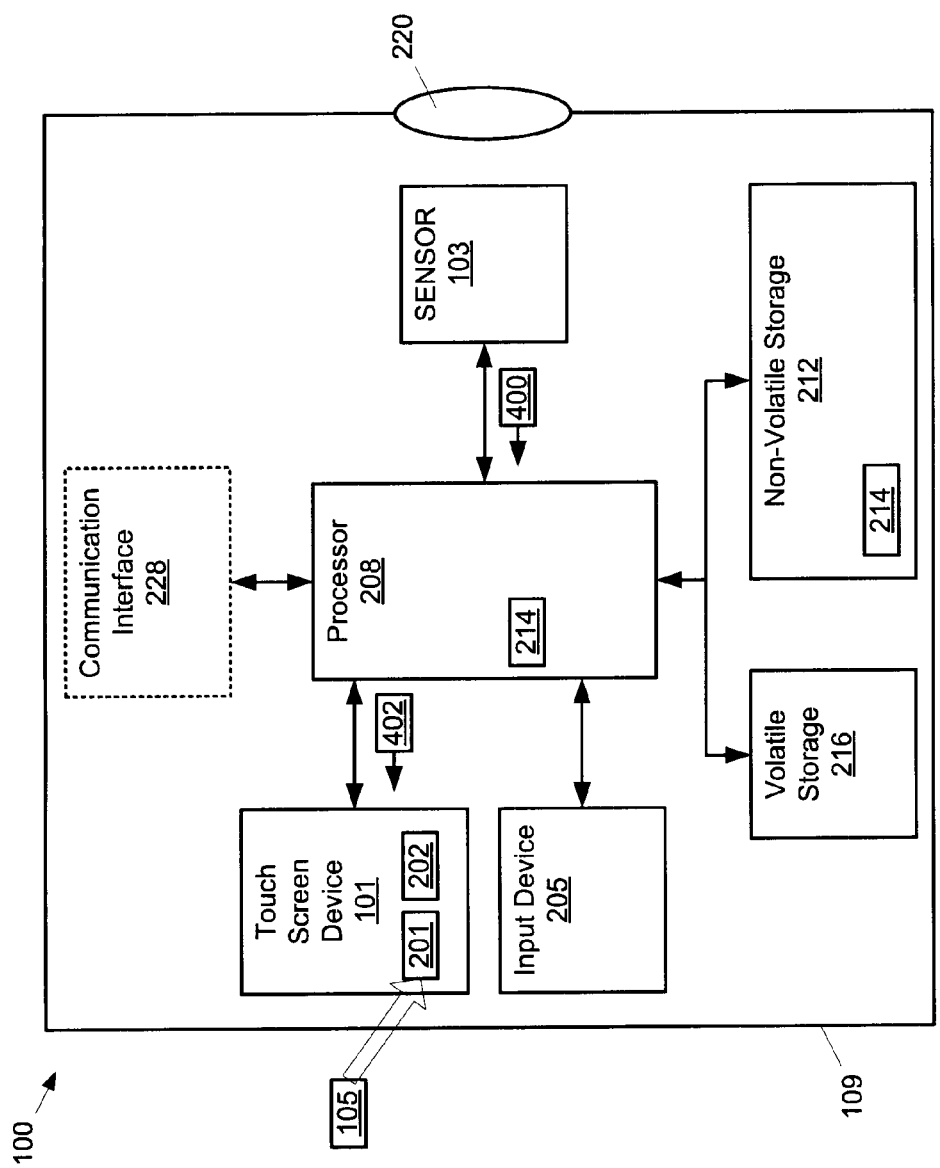
FIG. 4 depicts the schematic diagram of FIG. 2 showing flow of data when displaying an image at a touch screen, according to non-limiting implementations.

At block 301, processor 208 displays images 105 acquired via sensor 103 at touch screen 101, and specifically at display device 201, as described above. Hence, touch screen 101 generally displays images that are in the field of view of sensor 103: when the field of view changes (e.g. camera 100 is moved about), images 105 change. For example, attention is directed to FIG. 4, which is substantially similar to FIG. 2, with like elements having like numbers; in FIG. 4, processor 208 receives an electronic signal 400 from sensor 103 corresponding to image 105, and processor 208 in turn controls touch screen 101 by transmitting image data 402 to touch screen 101 causing touch screen 101 to display image 105 (e.g. processor 208 renders image 105 at touch screen 101).

At block 303, at least one of icon 107 and graphical control 108 is displayed at touch screen 101, and specifically at display device 201, as described above. For example, image data 402 can include data for displaying at least one of icon 107 and graphical control 108 and/or processor 208 can transmit icon data and/or graphical control data to touch screen 101 causing touch screen 101 to display at least one of icon 107 and graphical control 108 (e.g. processor 208 renders image 105 at touch screen 101).

It is appreciated that blocks 301, 303 can be performed in any suitable order and/or in parallel. Further at least one of icon 107 and graphical control 108 can be displayed upon start up of camera 100 and/or upon receiving input that at least one of icon 107 and graphical control 108 are to be displayed, and or when a condition for changing displaying of at least one of icon 107 and graphical control 108 is sensed at camera 100.

For example, input data can be received at one or more of input device 205 and touch screen panel 202 of touch screen 101 to control displaying of at least one of icon 107 and graphical control 108, to select given icons and graphical controls to display, and/or to turn displaying of at least one of icon 107 and graphical control 108 on and/or off. Further, camera 100 can be enabled to sense when a given icon and/or graphical control is to be displayed: for example, processor 208 can process images acquired via sensor 103 to determine whether the images comprise an image of a person and/or an animal (e.g. something with eyes). When an image of a person and/or an animal is sensed, a red-eye reduction control and/or a representation of a red-eye setting (e.g. icon 107) can be automatically displayed at touch screen 101.

Figure 5:
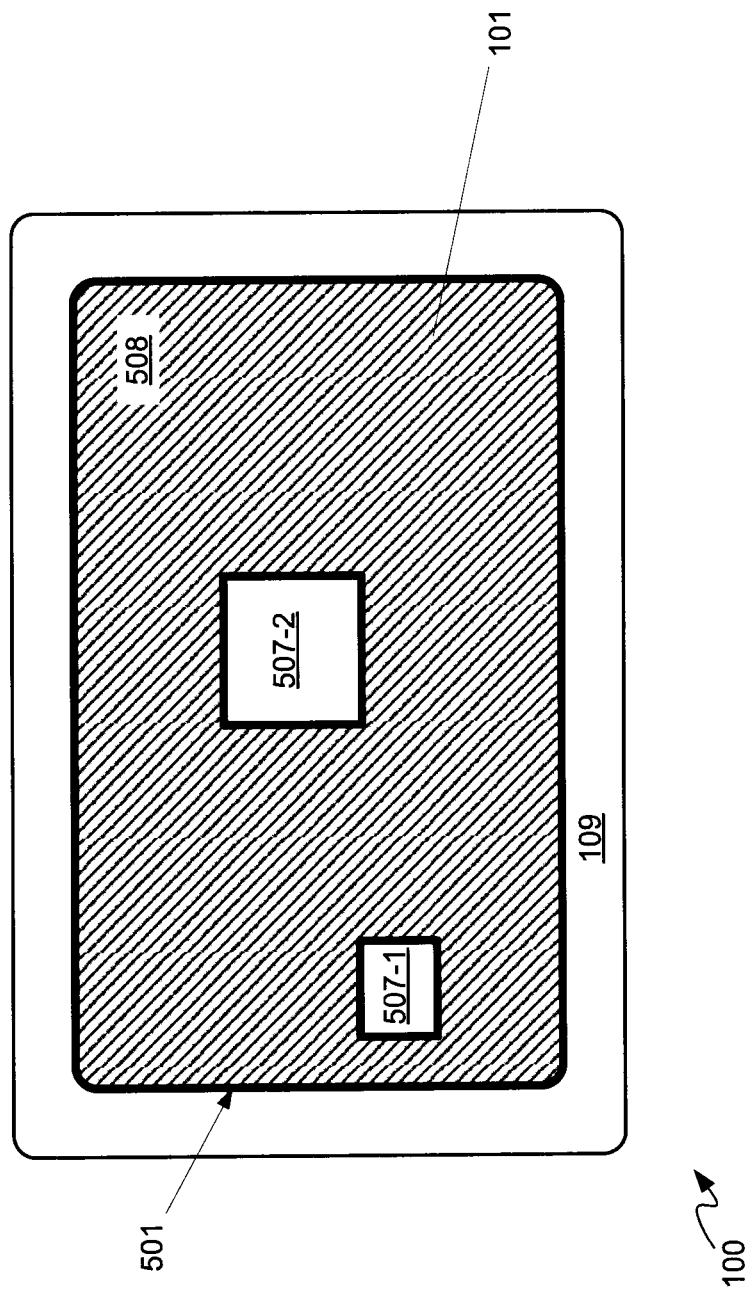
FIG. 5 depicts dynamic subregions of the camera device of FIG. 1, according to non-limiting implementations.

Attention is next directed to FIG. 5, which depicts a front view of camera 100, touch screen 101 and housing 109, but showing a region 501 having subregions 507-1, 507-2 respectively corresponding to icon 107 and graphical control 108. Subregions 507-1, 507-2 will be interchangeably referred to hereafter generically as a subregion 507, and collectively as subregions 507. Image 105 is not depicted in FIG. 5, however it is appreciated that image 105 is present. In essence region 501 and subregions 507 correspond to regions of display device 201 where images, icons, graphical controls and the like can be displayed, and further correspond to regions of touch screen panel 202 that can receive touch input. It is further appreciated that region 501 comprises further at least one subregion 508 outside of subregions 507 (e.g. any subregion other than subregions 507) where images can be displayed and touch input can be received. In general, subregion 508 contains neither icons nor graphical controls. It is further appreciated that, in some implementations, region 501 comprises an entire display area of touch screen 101

It is yet further appreciated that processor 208 can execute a shutter command to store image 105 in a memory, such as non-volatile storage unit 212, when touch input is received in region 501 when the at least one subregion 508 contains neither an icon and a graphical control. It is yet further appreciated that processor 208 can execute the shutter command to store the image in the memory when the touch input is received in region 501 but not in the at least one subregion 507 when the at least one subregion 507 contains at least one of icon 107 and graphical control 108.

For example, returning briefly to FIG. 3, at block 305, touch input is received in region 501. At block 307, processor 307 determines whether the touch input is received in at least one subregion 507 containing at least one of icon 107 and graphical control 108 or in at least one subregion 508 that contains neither an icon nor a graphical control. When touch input is received in subregion 508 containing neither an icon nor a graphical control (i.e. a "No" decision at block 307), at block 309 a shutter command is executed such that at block 311 image 105 is stored in a memory, such as non-volatile storage unit 212. Then at least one of blocks 301 to 305 re-occur; while FIG. 3 depicts an arrow from block 311 to block 301, it is appreciated that blocks 301, 303 do not necessarily re-occur and that any of blocks 301 to 305 can occur after block 311; alternatively method 300 can end.

Returning to block 307, when touch input is received in subregion 507 containing at least one of icon 107 and graphical control 108 (i.e. a "Yes" decision at block 307), at least one of blocks 301 to 305 re-occur as described above; optionally block 313 occurs and a graphical control command can be executed, corresponding to whichever of icon 107 and graphical control 108 was selected via the touch input received at block 305.

Figure 6:
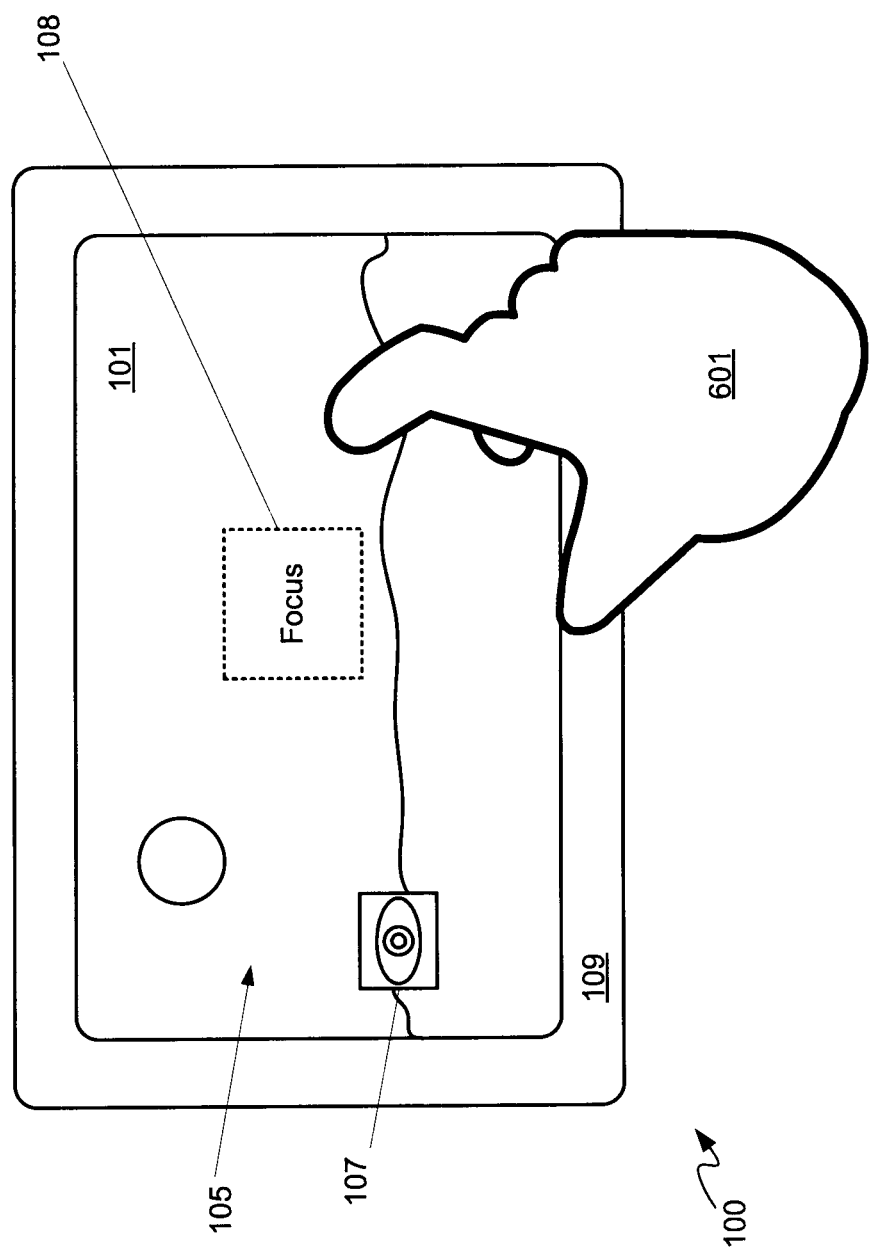
FIG. 6 depicts receipt of touch input at the camera device of FIG. 1, in a subregion that contains neither an icon nor a graphical control, according to non-limiting implementations.
Figure 7:
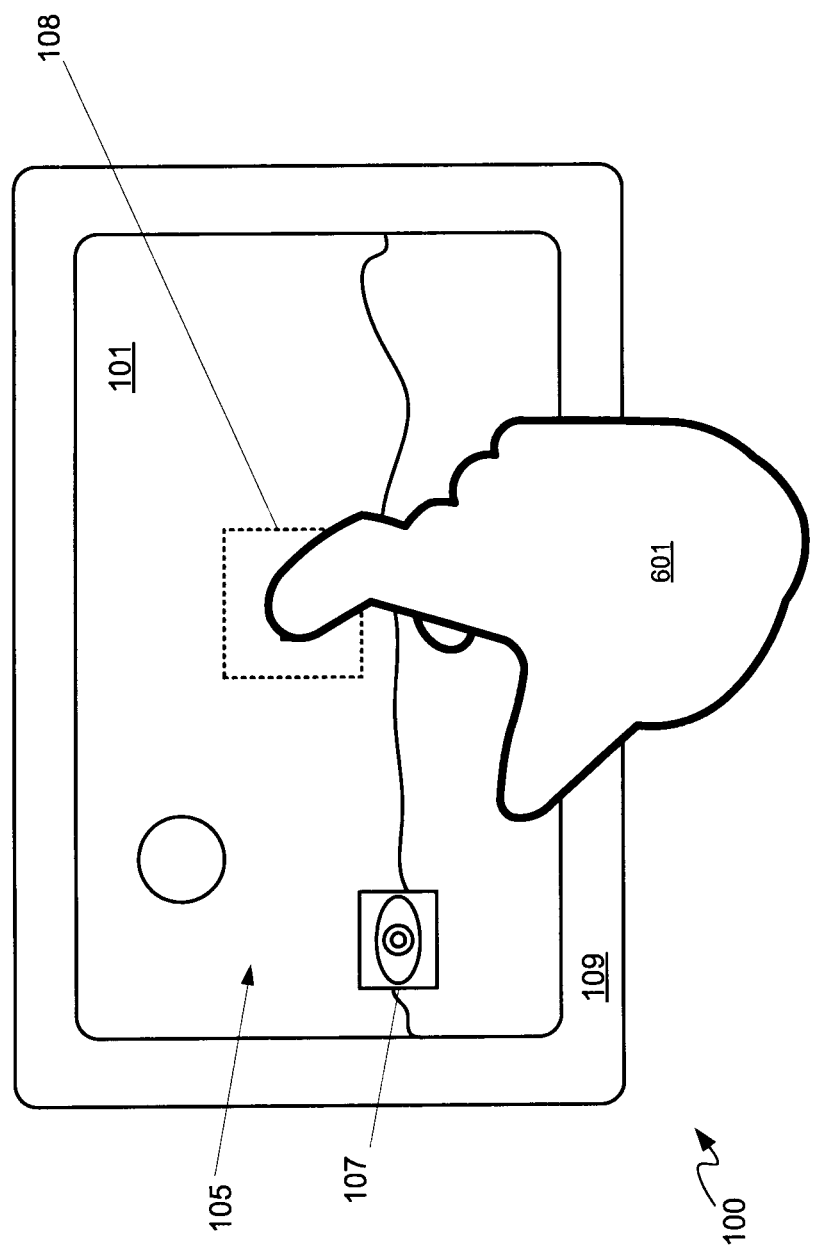
FIG. 7 depicts receipt of touch input at the camera device of FIG. 1, in a subregion that contains at least one of an icon and a graphical control, according to non-limiting implementations.

In other words, as depicted in FIGS. 6 and 7, each of which are similar to FIG. 1, with like elements having like numbers, when touch input is received at any subregion other than subregions 507 containing icons and/or graphical controls, a shutter command is executed to store image 105 in a memory. In FIG. 6, (and with further reference to FIG. 5) touch input is received via a hand 601 touching touch screen 101 (i.e. region 501), and specifically any region other than where icon 107 and/or graphical control 108 are displayed (i.e. subregion 508 and/or anywhere other than subregions 507). In FIG. 7, touch input is received via hand 601 touching touch screen 101 (i.e. region 501), and specifically a region containing at least one of icon 107 and/or graphical control 108 (i.e. one or more of subregions 507). A shutter command is not executed and a graphical control command corresponding to the touched icon 107 and/or touched graphical control 108 can be executed.

Figure 8:
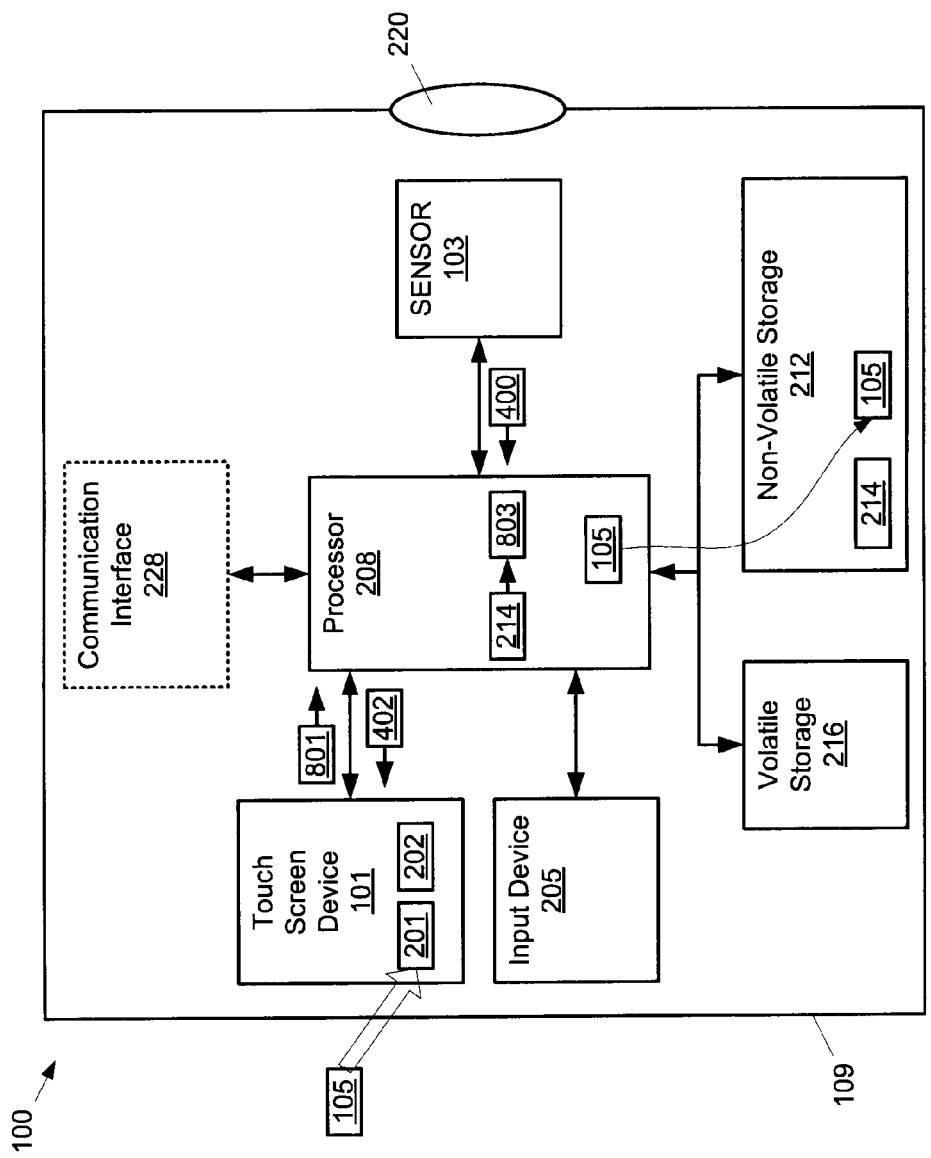
FIG. 8 depicts the schematic diagram of FIG. 2 showing execution of a shutter command, according to non-limiting implementations.

With reference to FIG. 8 (substantially similar to FIG. 4, with like elements having like numbers) when touch input 801 is received at touch screen 101 (and generally received at processor 208), processor 208 executes a shutter command 803 (i.e. via processing of programming instructions 214) causing image 105 to be stored at non-volatile storage unit 212.

Figure 9:
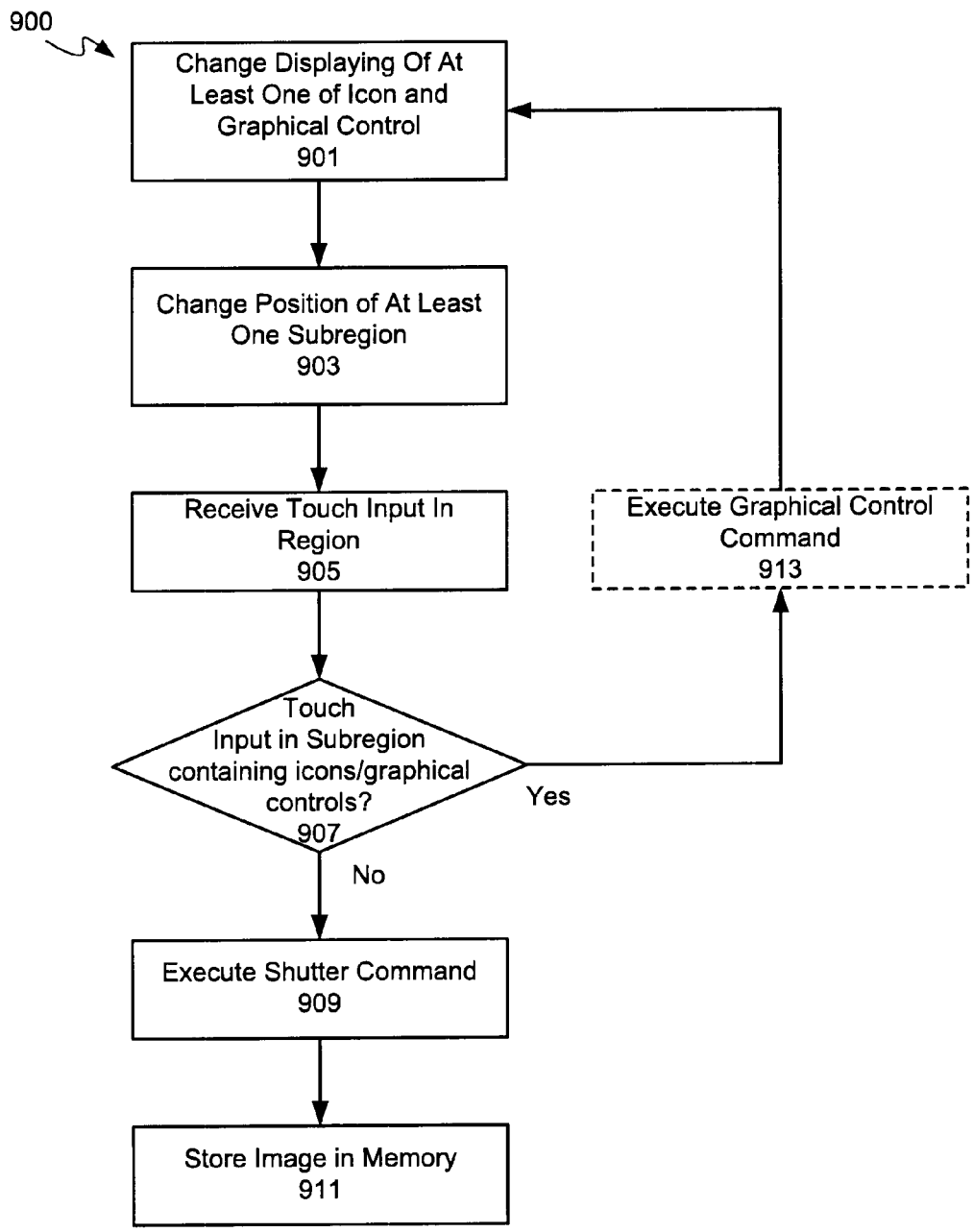
FIG. 9 depicts a flowchart illustrating a method for controlling a dynamic touch screen shutter at the camera device of FIG. 1, according to non-limiting implementations.

Attention is next directed to FIG. 9 which depicts a flowchart illustrating a method 900 for controlling a dynamic touch screen shutter at a camera device, according to non-limiting implementations. In order to assist in the explanation of method 900, it will be assumed that method 900 is performed using camera 100. Furthermore, the following discussion of method 900 will lead to a further understanding of camera 100 and its various components. However, it is to be understood that camera 100 and/or method 900 can be varied, and need not work exactly as discussed herein in conjunction with each other, and that such variations are within the scope of present implementations. It is appreciated that, in some implementations, method 900 is implemented in camera 100 by processor 208.

It is to be emphasized, however, that method 900 need not be performed in the exact sequence as shown, unless otherwise indicated; and likewise various blocks may be performed in parallel rather than in sequence; hence the elements of method 900 are referred to herein as "blocks" rather than "steps". It is also to be understood that method 900 can be implemented on variations of camera 100 as well.

It is further appreciated that blocks of method 900 can be implemented in parallel to method 300 and indeed blocks 905, 907, 909, 911, 913 of method 900 respectively correspond to blocks 305, 307, 309, 311, 313 of method 300. It is yet further appreciated in method 900 that blocks similar to block 301 and 303 of method 300 have been implemented such that image 105, and at least one of icon 107 and graphical control 108 are displayed at touch screen 101.

At block 901, displaying of at least one of icon 107 and graphical control 108 is changed. In response at block 903 a position of at least one subregion 507 is changed.

In other words, at block 901, at least one of icon 107 and graphical control 108 can be moved to a new position and/or removed. In yet further implementations, one or more new icons and/or graphical controls can be displayed at touch screen 101. It is appreciated that a change of displaying of at least one of icon 107 and graphical control 108 can occur when input data is received at one or more of input device 205 and touch screen 101; the received input data is recognized by processor 208 as input data for causing a change in displaying of at least one of icon 107 and graphical control 108. In yet further implementations, a change of displaying of at least one of icon 107 and graphical control 108 can occur when a condition for changing displaying of one or more at least one of icon 107 and graphical control 108 is sensed at camera 100, as described above.

Figure 10:
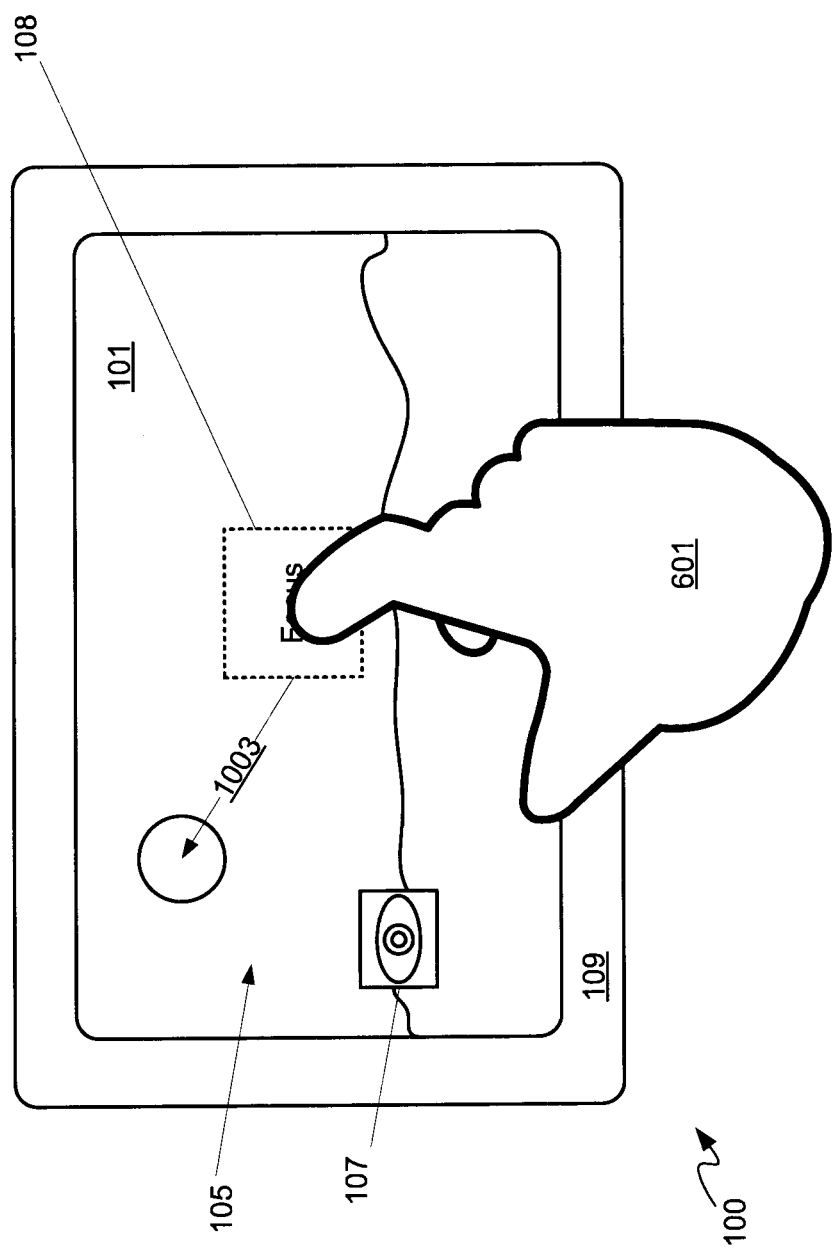
FIG. 10 depicts movement of a graphical control displayed at the camera device of FIG. 1, according to non-limiting implementations.
Figure 11:
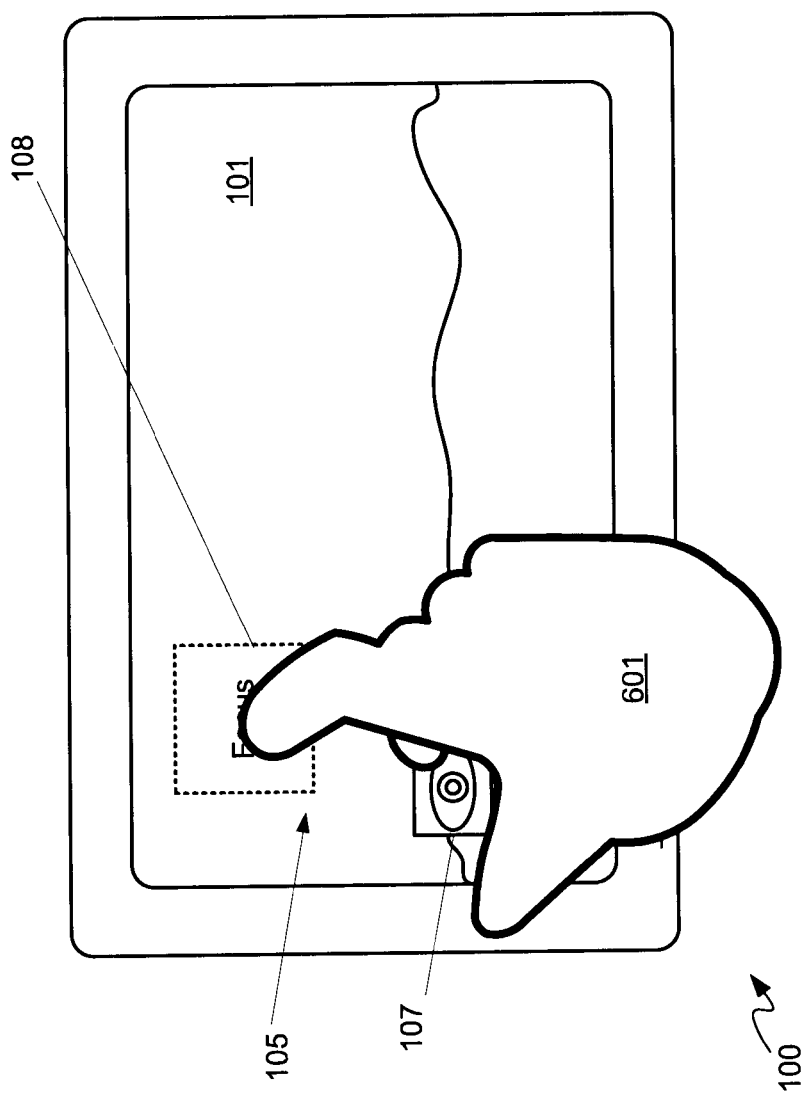
FIG. 11 depicts final position of a moved graphical control displayed at the camera device of FIG. 1, according to non-limiting implementations.

An example of changing displaying of at least one of icon 107 and graphical control 108 is depicted in FIGS. 10 and 11, each of which are substantially similar to FIG. 6, with like elements having like numbers. Specifically, in FIG. 10 touch input is received at graphical control 108 via hand 601 touching touch screen 101 at a subregion corresponding to graphical control 108 (i.e. subregion 507-2). Graphical control 108 is then dragged to a new position as indicated by arrow 1003 in FIG. 10, the new position of graphical control 108 depicted in FIG. 11.

Figure 12:
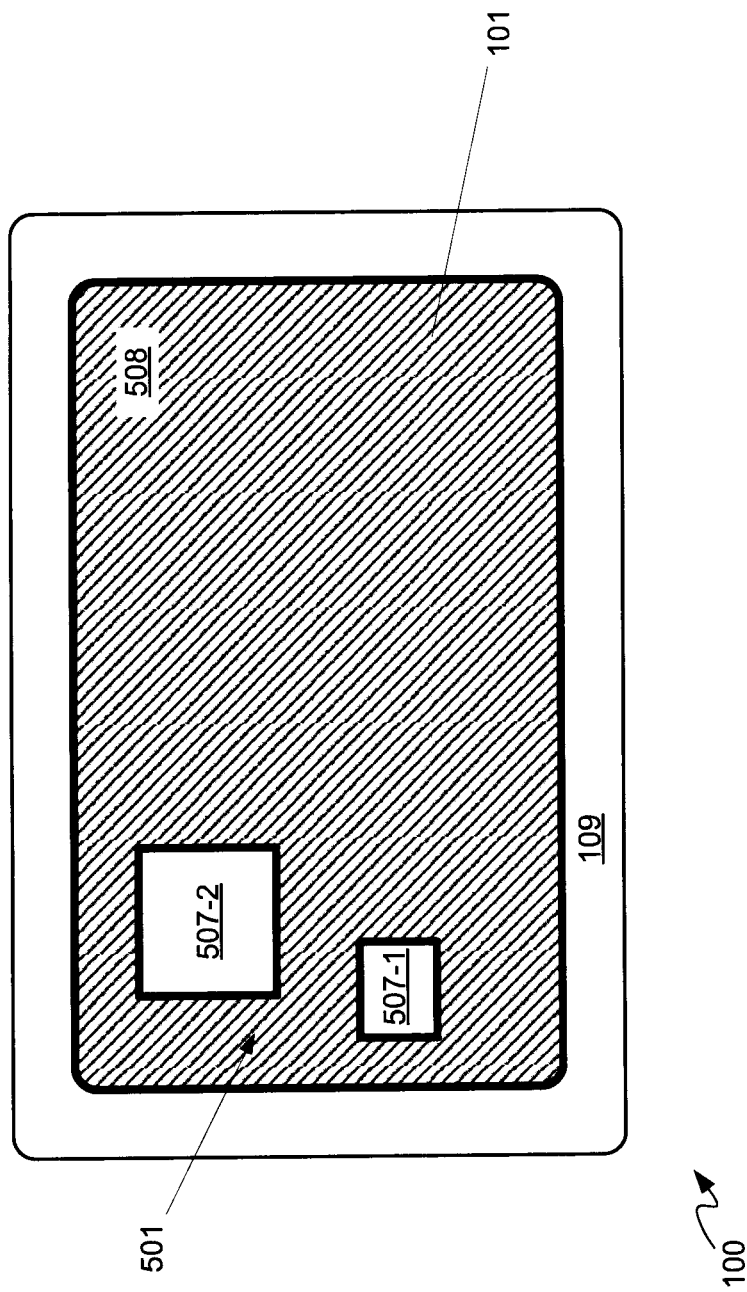
FIG. 12 depicts updated dynamic regions of the camera device of FIG. 1 after movement of a graphical control, according to non-limiting implementations.

Hence, with reference to FIG. 12, which is substantially similar to FIG. 5, with like elements having like numbers, a position of at least one subregion 507-2, corresponding to graphical control 108 changes to a new position (i.e. block 903).

In other words, at least one of icon 107 and graphical control 108 is moveable on touch screen 101, and processor 208 is enabled to dynamically change a position of at least one subregion 507 in response thereto.

It is further appreciated that processor 208 is further enabled to: execute the shutter command 803 when the touch input is received in a previous position of the at least one subregion 507-2 but not in a current position of the at least one subregion 507-2. In other words, comparing FIGS. 5 and 12, when at least one subregion 507 is moved and when touch input is received at a previous position no longer corresponding to at least one of icon 107 and graphical control 108, shutter command 803 is executed.

Returning to FIG. 9, at block 905, 907, 909, 911, 913 are then executed similar to blocks 305, 307, 309, 311, 313 described above.

Figure 13:
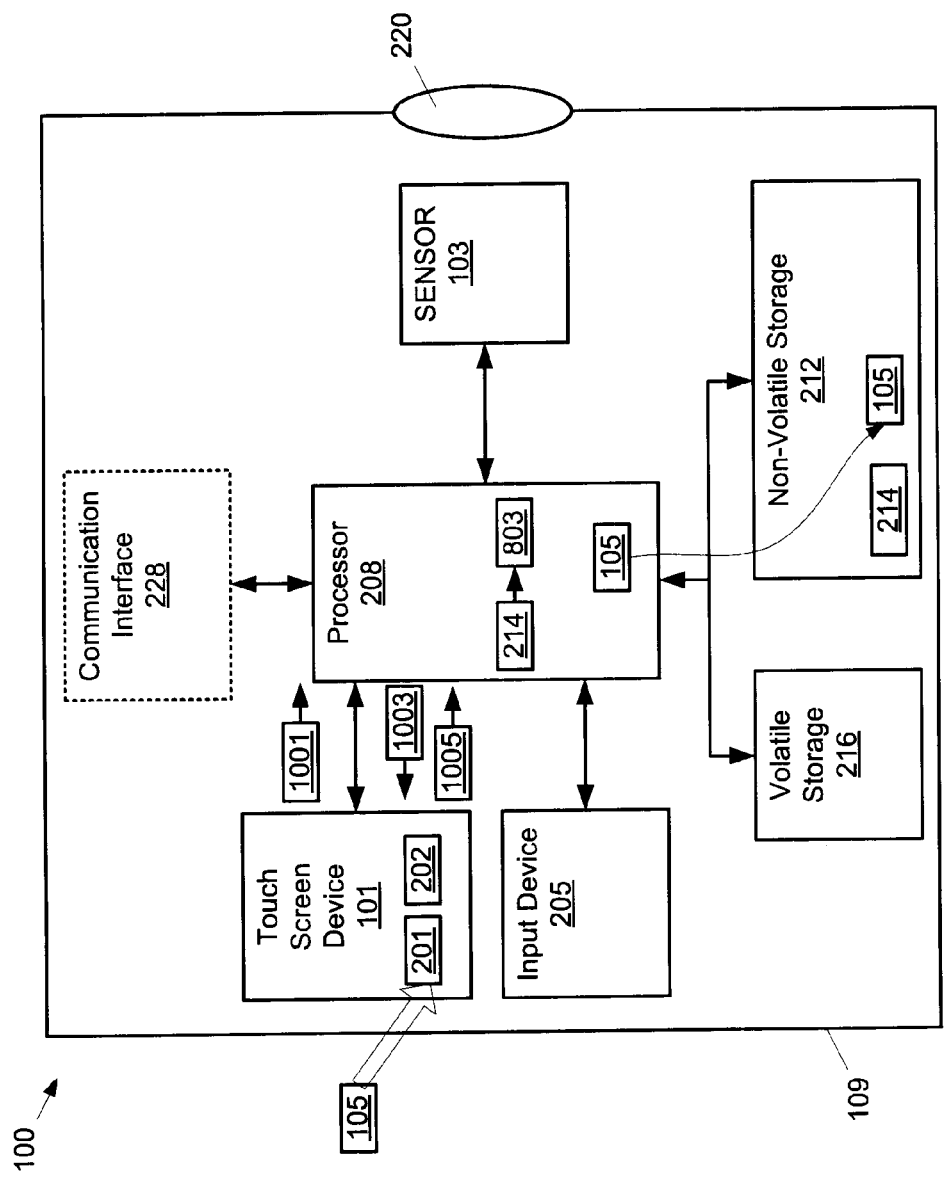
FIG. 13 depicts the schematic diagram of the camera device of FIG. 2 showing flow of data therein when displaying of at least one of an icon and a graphical control changes, according to non-limiting implementations.

The flow of data at camera 100 when implementing method 300 and/or method 900 is depicted at FIG. 13, which is substantially similar to FIG. 2, with like elements having like numbers. It is presumed in FIG. 13 that blocks 301, 303 of method 300 have been implemented. Block 901 can be implemented when touch input is received at touch screen 101 indicative that a change in displaying of at least one of icon 107 and graphical control 108 has changed, and touch screen 101 transmits data 1001 indicative of receipt of touch input. In response, processor 208 transmits data 1003 to touch screen 101 to dynamically change a position of at least one subregion 507 (block 903). It is appreciated that data similar to data 1001, 1003 can be exchanged between touch screen 101 and processor 208 whenever a change occurs to at least one of icon 107 and graphical control 108.

When touch input is received in region 501, and specifically in subregion 508 not containing at least one an icon and a graphical control, touch screen 101 transmits data 1005 indicative of such to processor 208 (block 905), which in response executes shutter command 803 (block 909) causing image 105 to be stored at non-volatile storage unit 212.

Figure 14:
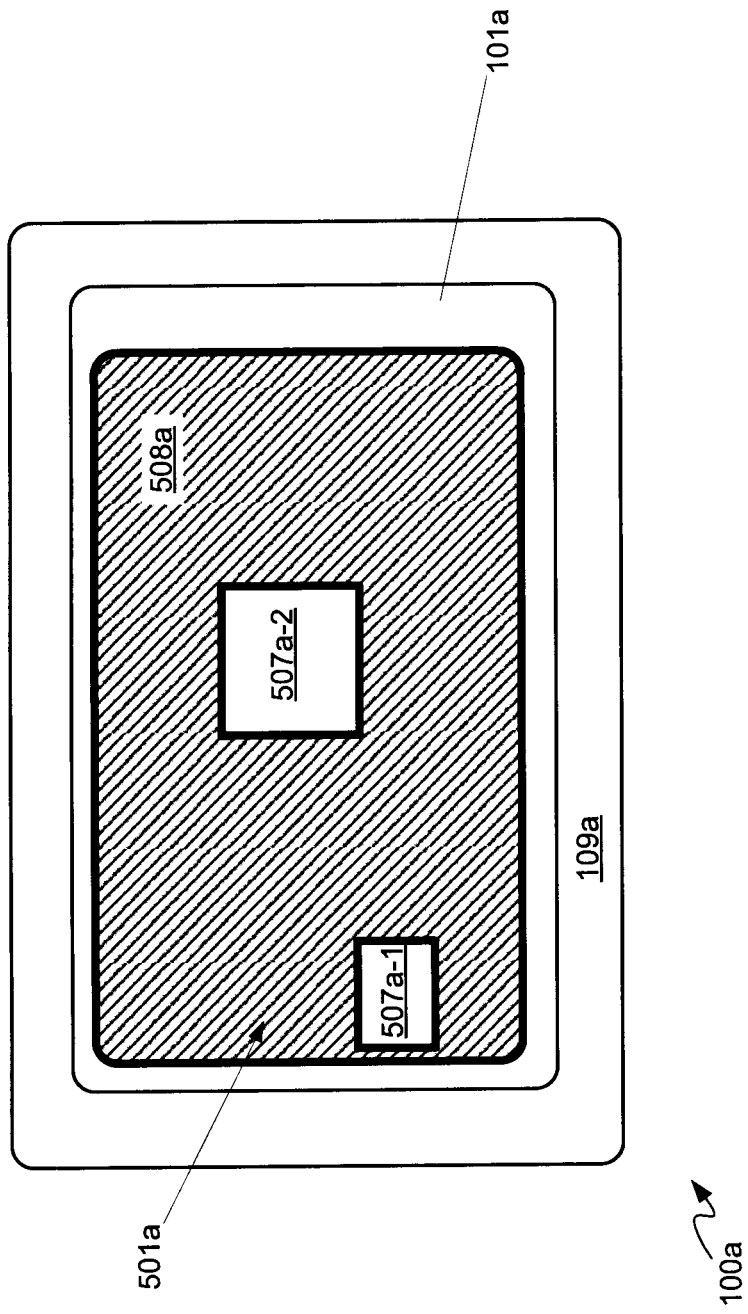
FIG. 14 depicts a reduced region for receiving touch input to execute a shutter function, according to non-limiting implementations.

Persons skilled in the art will appreciate that there are yet more alternative implementations and modifications possible. For example, it is appreciated that in depicted implementations, region 501 comprises an entire display area of touch screen 101, such that a border of region 501 is similar to a border of touch screen 101. However, in other implementations, the borders of region 501 are not necessarily similar to borders of touch screen 101. For example, attention is directed to FIG. 14, similar to FIG. 5, with like elements having like numbers however with an "a" appended thereto. Specifically, FIG. 14 depicts a camera 100*a* similar to camera 100, camera 100*a* comprising a touch screen 101*a* and chassis 109*a*; it is appreciated that, while not depicted, camera 100*a* further comprises components corresponding to components of camera 100, including but not limited to a sensor similar to sensor 103 and a processor similar to processor 208. Further, while not depicted, at least one of an icon and a graphical control is displayed in subregions 507*a*-1 and 507*a*-2, and no icons and/or graphical controls are displayed in subregion 508*a*. In any event, at camera 100*a*, region 501*a* has borders that fit within borders of touch screen 101*a*.

It is appreciated that the specific borders of region 501*a* are not to be considered particularly limiting, and any suitable region 501*a* is within the scope of present implementations.

It is further appreciated that region 501 of FIG. 5 can be reduced and/or enlarged, either dynamically or upon receipt of input data indicating that region 501 is to be reduced and/or enlarged. For example, region 501 can be dynamically reduced such that borders of region 501 correspond to borders of region 501*a* of FIG. 14. Dynamic reduction of region 501 can occur when processor 208 determines images have been acquired when shutter command 803 is executed when touch input occurs at and/or proximal to borders of area 501. Processor 208 can further process such images to determine content thereof to determine whether such images can be classified as accidental, or the like. Criteria for classifying an image as accidental can include, but is not limited to, an image being black and/or having very low lighting, an image being out of focus, an image being of poor quality based on criteria in image processing routines, and the like. When a threshold number of such accidental images have been acquired (e.g. images that are of poor quality/blurry/dark and acquired when touch input is within a given distance of borders of touch screen 101), processor 208 can dynamically reduce borders of area 501 to smaller than borders of touch screen 101.

However, while specific conditions for dynamically reducing area 501 are described herein, it is appreciated that such conditions are provided as examples only and other conditions are within the scope of present implementations. For example, another condition can be a threshold number of images acquired via shutter control touch input received at borders of touch screen 101 exclusive of image analysis.

By providing a dynamic touch shutter at a camera device that excludes icons and graphical controls displayed at a touch screen device, present implementations provide an easy and effective way to acquire and store images without interfering with other touch input icons and/or graphical controls of the camera device. Further, by dynamically changing the subregions associated with one or more of the icons/graphical controls and the touch shutter, when displaying of icons/graphical controls changes (e.g. one or more icons and/or graphical controls are moved and/or dragged to new location, and/or one or more new icons/graphical controls are displayed and/or displaying of one or more icons/graphical controls ceases), present implementations provide a further easy and effective way to acquire and store images without interfering with other controls of the camera device.

Those skilled in the art will appreciate that in some implementations, the functionality of camera devices 100, 100a can be implemented using pre-programmed hardware or firmware elements (e.g., application specific integrated circuits (ASICs), electrically erasable programmable read-only memories (EEPROMs), etc.), or other related components. In other implementations, the functionality of camera device 100, 100a can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore is only to be limited by the claims appended hereto.

What is claimed is:

1. A camera device, comprising:
a sensor for providing an electronic signal corresponding to an image;
a touch screen having a region for displaying the image and receiving single touch input, the region having at least one subregion; and
a processor enabled to:
display the image in the region;
execute a shutter command to store the image in a memory when the single touch input is received in the region but not in the at least one subregion when the at least one subregion contains a graphical control, the graphical control for controlling the camera device, the graphical control including a focal control area and, when the single touch input is received in the at least one subregion containing the graphical control, the shutter command is prevented from being executed;
change displaying of the graphical control; and, in response,
dynamically change a position of the at least one subregion within the region.

2. The camera device of claim 1, wherein the at least one subregion further contains an icon representing a non-default operating condition of the camera device.

3. The camera device of claim 1, wherein the processor is further enabled to: execute the shutter command when the single touch input is received in a previous position of the at least one subregion but not in a current position of the at least one subregion.

4. The camera device of claim 1, wherein the processor is further enabled to change displaying of the at least one subregion when one or more of:
input data is received to change displaying of the graphical control; and,
a condition for changing displaying of the graphical control is sensed at the camera device.

5. The camera device of claim 1, wherein the graphical control is moveable on the touch screen, the processor further enabled to dynamically change a position of the at least one subregion in response thereto.

6. The camera device of claim 1, wherein the region comprises an entire display area of the touch screen.

7. The camera device of claim 1, further comprising one or more of a tablet device, a computing device, a personal computer, a laptop computer, a portable electronic device, a mobile computing device, a portable computing device, a tablet computing device, a laptop computing device, a desktop phone, a telephone, a PDA (personal digital assistants), a cellphone, a smartphone, and a digital camera.

8. The camera device of claim 1, wherein the at least one graphical control further comprises controls to adjust one or more of: shutter settings, red eye reduction settings; focus settings; depth of focus settings; a memory size of the at least one image; and a resolution of the least one image.

9. The camera device of claim 1, wherein the sensor comprises at least one of: a digital camera sensor; a CMOS (Complementary metal-oxide-semiconductor) image sensor; and a CCD (charge-coupled device) image sensor.

10. The camera device of claim 1, wherein the touch screen comprises:
one or more of a cathode ray tube, a flat panel display, a liquid crystal display (LCD), an organic light emitting diode (OLED) display, and a plasma display; and,
one or more of a capacitive touch screen panel and a resistive touch screen panel.

11. The camera device of claim 1, further comprising a housing, the housing comprising the sensor, the memory, the touch screen device and the processor.

12. The camera device of claim 1, further comprising a lens system for focusing light on the sensor.

13. The camera device of claim 1, further comprising the memory.

14. The camera device of claim 1, the processor further enabled to: execute the shutter command to store the image in the memory when the single touch input is received in the region when the at least one subregion does not contain the graphical control.

15. A method in a camera device, comprising:
displaying an image in a region of a touch screen of the camera device, the region having at least one subregion, the image acquired via a sensor for providing an electronic signal corresponding to the image;
executing, via a processor of the camera device, a shutter command to store the image in a memory when single touch input is received in the region but not in the at least one subregion when the at least one subregion contains a graphical control, the graphical control for controlling the camera device, the graphical control including a focal control area and when the single touch input is received in the at least one subregion containing the graphical control, the shutter command is prevented from being executed;
changing displaying of the graphical control; and, in response,
dynamically changing a position of the at least one subregion within the region.

16. The method of claim 15, wherein the at least one subregion further contains an icon representing a non-default operating condition of the camera device.

17. The method of claim 15, further comprising: executing the shutter command when the single touch input is received in a previous position of the at least one subregion but not in a current position of the at least one subregion.

18. The method of claim 15, further comprising changing displaying of the at least one subregion when one or more of:
input data is received to change displaying of the graphical control; and,
a condition for changing displaying of the graphical control is sensed at the camera device.

19. The method of claim 15, wherein the graphical control is moveable on the touch screen, the method further comprising dynamically changing a position of the at least one subregion in response thereto.

20. The method of claim 15, wherein the region comprises an entire display area of the touch screen.

21. The method of claim 15, further comprising: executing the shutter command to store the image in a memory when the single touch input is received in the region when the at least one subregion does not contain the graphical control.

22. A computer program product, comprising a non-transitory computer usable medium having a computer readable program code adapted to be executed to implement a method comprising:
displaying an image in a region of a touch screen of the camera device, the region having at least one subregion, the image acquired via a sensor for providing an electronic signal corresponding to the image;
executing, via a processor of the camera device, the shutter command to store the image in a memory when a single touch input is received in the region but not in the at least one subregion when the at least one subregion contains a graphical control, the graphical control for controlling the camera device, the graphical control including a focal control area and, when the single touch input is received in the at least one subregion containing the graphical control, the shutter command is prevented from being executed;
changing displaying of the graphical control; and, in response,
dynamically changing a position of the at least one subregion within the region.

23. The camera device of claim 1, wherein the focal control area comprises an area for controlling focus.

24. The method of claim 15, wherein the focal control area comprises an area for controlling focus.

25. The computer program product of claim 22, wherein the focal control area comprises an area for controlling focus.

* * * * *